United States Patent [19]

Schiff et al.

[11] 4,285,587
[45] Aug. 25, 1981

[54] COMPACT MULTIPLE IMAGE CAMERA

[75] Inventors: Otto M. Schiff, Irvine; Vitolds Rikis, Mission Viejo, both of Calif.

[73] Assignee: Schiff Photo Mechanics, Santa Ana, Calif.

[21] Appl. No.: 157,674

[22] Filed: Jun. 9, 1980

[51] Int. Cl.³ .................. G03B 29/00; G03B 1/00; G03B 27/42; G03B 27/70
[52] U.S. Cl. .................. 354/124; 346/110 R; 355/53; 355/66
[58] Field of Search .................. 354/75, 76, 120, 123, 354/124, 125; 346/110 R; 355/20, 53, 54, 65, 66

[56] References Cited

U.S. PATENT DOCUMENTS

| 771,282 | 10/1904 | Smith | 354/124 |
| 953,005 | 3/1910 | Goddard | 354/124 |
| 2,166,440 | 7/1939 | Jones | 354/75 X |
| 2,172,283 | 9/1939 | Kirby et al. | 354/124 |
| 2,388,240 | 11/1945 | Appling | 354/124 |
| 2,584,311 | 2/1952 | Wells | 354/124 |
| 2,751,275 | 6/1956 | Mansberg | 346/110 R |
| 2,940,358 | 6/1960 | Rosenthal | 355/66 |
| 3,667,364 | 6/1972 | Mann | 355/53 X |
| 3,680,461 | 8/1972 | Amesbury et al. | 355/53 X |
| 3,684,365 | 8/1972 | Dahlquist et al. | 354/76 X |
| 3,762,293 | 10/1973 | Moodie | 354/124 |
| 3,796,489 | 3/1974 | Sone et al. | 355/54 |
| 4,027,315 | 5/1977 | Barney | 354/76 |
| 4,089,019 | 5/1978 | Jonker | 354/124 |

FOREIGN PATENT DOCUMENTS

| 693234 | 8/1964 | Canada | 355/53 |
| 389391 | 7/1965 | Switzerland | 355/53 |

Primary Examiner—Donald A. Griffin
Attorney, Agent, or Firm—Gausewitz, Carr, Rothenberg & Edwards

[57] ABSTRACT

A multi-image camera sequentially exposes upon a film sheet a number of images of an oscilloscope that displays images of a patient subjected to a scanning device. Camera optics and motion of parts are arranged to provide a lightweight and compact package. Fixed to the elongated oscilloscope body is an optical system having a folded optical path that provides an output leg parallel to and above and to the rear of the oscilloscope screen. A sheet film slide carrier is mounted for slidable motion backward and forward relative to and just above the oscilloscope body. The oscilloscope, together with the folded path optical system, is mounted for motion from side to side.

34 Claims, 6 Drawing Figures

COMPACT MULTIPLE IMAGE CAMERA

BACKGROUND OF THE INVENTION

The present invention relates to multiple image cameras and more particularly concerns a compact packaging of the camera and its optical system to provide a lightweight, small size package that enables multiple images of a display to be successively directed to different areas of a photographic sheet film.

In the course of certain types of medical analyses and diagnoses, electromagnetic or other types of radiated, energy, is received from a patient's body by a suitable scanning device, converted into electrical signals and fed to an oscilloscope or video monitor having a screen upon which appears a display that conveys useful medical information. Because of the momentary and ever changing nature of the display on the oscilloscope screen, it is common practice to make a permanent photographic record of the display using a standard eight inch by ten inch sheet film or equivalent. Generally, the display on the oscilloscope screen is decreased in size, electronically, optically, or both, to enable photographing, on the single sheet, an array of four, six or nine images successively appearing on the display screen. A number of different types of cameras and camera oscilloscope combinations have been developed to enable shifting of the optical image of the display screen in two directions, in X and in Y, relative to the sheet film so as to provide a suitable number of mutually spaced and precisely positioned images thereon.

One multiple image camera of this type is shown in the patent to Barney U.S. Pat. No. 4,027,316, in which a sheet film is positioned in front of and parallel to the oscilloscope display screen and an optical system is interposed between the two. The optical system carries a lens that is movable vertically and horizontally, in X and Y directions generally parallel to the plane of the display screen, so as to provide the desired pattern and number of images of the video display. As compared to a camera having a film carrier movable in both X and Y directions, the movable lens arrangement requires smaller motions of the lens and presents lesser light sealing problems. Such an arrangement, however, requires the shiftable lens be operated in an off axis mode in most positions. This is undesirable optically, providing brightness differentials and, if the video monitor has a curved screen, also providing variable distortion from one lens position to the next. Moreover, because there is a minimum length of optical path, required by commonly used lenses, between the film and the display, arrangements of the type illustrated in the Barney patent are undesirably large. The optical path length requires a longer distance between display screen and film carrier to house a lens and film in appropriate positions directly in front of the display screen. Since cameras of this type generally supplement other scanning and diagnostic equipment, size and space requirements are of major importance. Thus, a multiple image camera of the type shown by Barney requires a large table or other horizontal support, if the display screen is oriented in a vertical plane. To conserve horizontal space, the multiple image movable lens camera is often floor mounted, with the display screen oriented in a horizontal plane, but again this requires an excessive amount of vertical space.

Another type of multiple image camera used for medical purposes provides an arrangement in which the lens system is fixed to the monitor and the entire monitor and lens system are moved together in X and Y relative to a fixed film. This arrangement solves the off-axis optical problem, but is also exceedingly large and bulky. Moreover, the requirement to move the monitor, not only horizontally, but also vertically, imposes more severe requirements upon the supporting and driving structure which must raise the entire monitor and optical assembly. Again, this arrangement is undesirably large for reasons similar to those related to size of the moving lens camera.

Although the use of a mirror in an optical system for folding an optical path is known as shown, for example, in the U.S. Pat. No. 2,166,440, no cameras are known to applicant which minimize overall packaging dimensions with a multi-image format, nor which employ an optimum arrangement of folded optical path with selected motion of camera parts so as to provide a combined video monitor and camera combination of minimum size.

SUMMARY OF THE INVENTION

In carrying out principles of the present invention in accordance with a preferred embodiment thereof, a folded optical system is arranged to transmit light from an oscilloscope display screen along an optical output path positioned rearwardly of the screen and generally parallel thereto. The oscilloscope and optical system are mounted for bi-directional motion in a first direction and the film is mounted for bi-directional motion in a second and transverse direction thereby to decrease overall package volume. A relatively long optical path is available utilizing a fixed lens which, at all times, is on and optically aligned with the optical axis of the system.

DETAILED DESCRIPTION

Figures 1, 4:
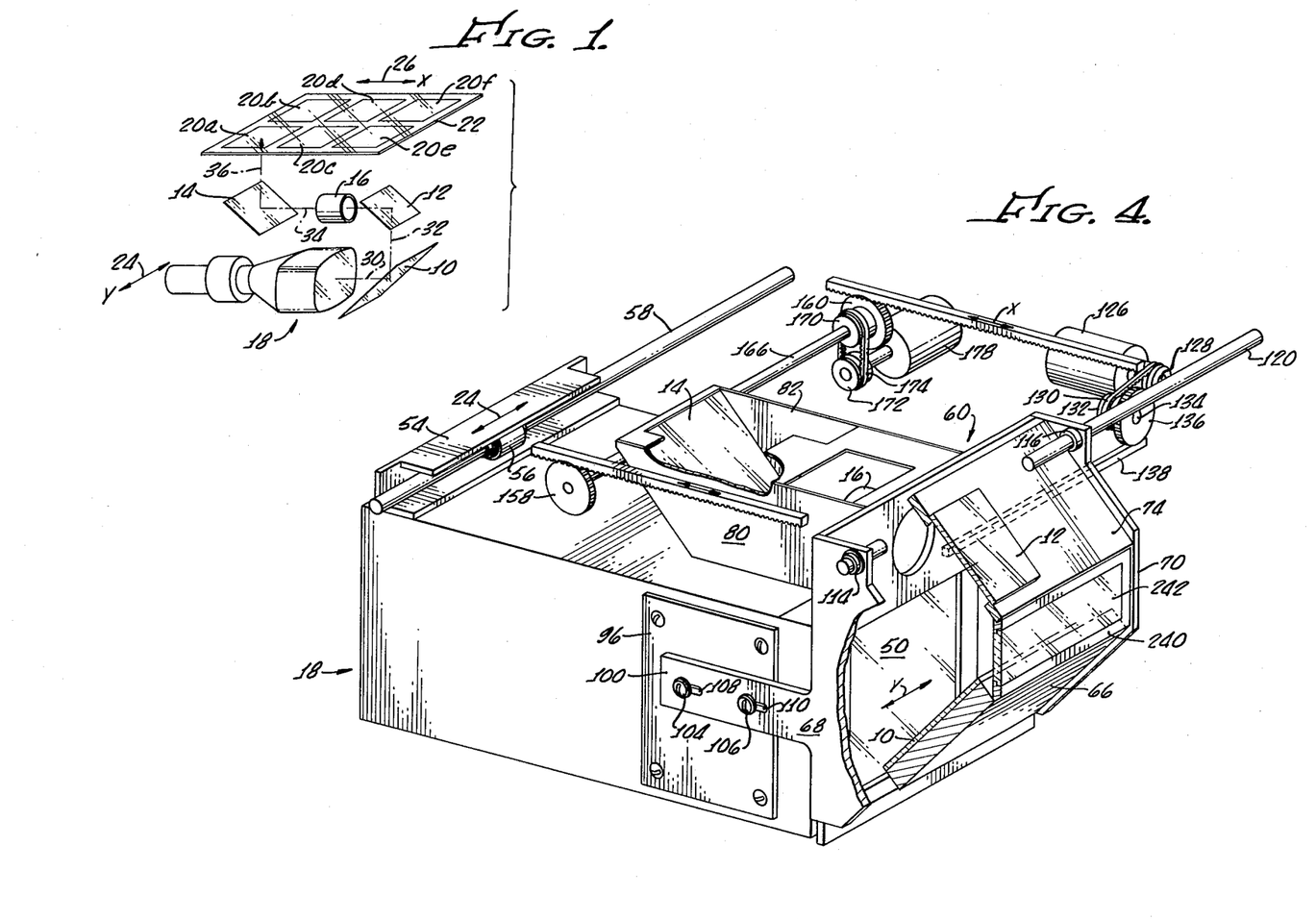
FIG. 1 is a schematic representation of major components of a multiple image camera embodying principles of this invention.
FIG. 4 is a partly schematic perspective view with parts broken away of portions of the subassembly of video monitor and optical system.

A multiple image camera embodying principles of the present invention is arranged to rest upon a table top or other suitable horizontal support, and to have all parts within a camera housing that is only slightly larger in each of three dimensions than the video monitor that provides the display of which multiple photographic images are to be made upon a single sheet of film. As schematically illustrated in FIG. 1 a folded optical path including three mirrors 10, 12 and 14, having an interposed lens 16, is provided in an optical system that is fixedly mounted to a video monitor 18 so as to pass the image of a display on the face of the monitor to a selected one of six areas 20*a, b, c, d, e* and *f* on a sheet film 22. The optical system and monitor are mounted in a camera housing (not shown in FIG. 1) for bi-directional transverse or Y-axis motion as indicated by arrow 24. Sheet film 22 is mounted for bi-directional motion in the X-axis direction, indicated by arrow 26, relative to the camera housing and relative to the oscilloscope and optical system. The monitor schematically indicated at 18 is longitudinally elongated in the X-axis direction, the direction of arrow 26, and the mirrors 10, 12 and 14, are spaced and oriented to provide a folded optical path having a first horizontal or X-axis leg 30, a second vertically directed Z-axis leg 32, a third rearwardly directed horizontal X-axis leg 34, and an output leg 36 vertically directed upwardly. The arrangement is such that output leg 36 of the folded optical path is centered transversely across the width of the video monitor and is longitudinally positioned substantially rearwardly of the monitor face. Accordingly, with the longitudinally movable sheet film 22 positioned at a central point in its longitudinal slidable motion, so that output path 36 is centered upon either of areas 20*c* or 20*d* in this exemplary six-image format, the film need only move longitudinally by less than half its length, either forwardly or rearwardly, to enable areas 20*a*, 20*b*, 20*e*, or 20*f* to be intersected by the output path 36.

Similarly, the monitor 18 and the optical system, which are mounted to the camera housing for transverse slidable motion as indicated by arrow 24, are mounted so that in one extreme of the side-to-side motion of the monitor/optical system assembly, output path 36 will intersect any one of film areas 20*a*, 20*c*, 20*e* (depending upon the longitudinal forward or rearward position of the film) and in another extreme position will intersect any one of areas 20*b*, 20*d*, 20*f* of the film.

The three mirrors provide a folded optical path having a length sufficient to enable use of a relatively long focal length on-axis lens 16, the path having a major portion of its length in leg 34 which extends within the area bounded by the back of the monitor and the forward end of the optical system. Thus, the length of the assembly required to accommodate the length of optical path is kept to a minimum. Further, the height of the assembly, in the direction parallel to optical path legs 32 and 36, is also minimized since these legs may be relatively short and need provide relatively small additional optical path lengths beyond that provided by the horizontal path leg 34. Additionally, the relatively heavy monitor need be moved only in one direction and thus, the motor and drive for the X-axis handles only the small weight of the film 22 and its carrier (not shown in FIG. 1).

Figure 2:
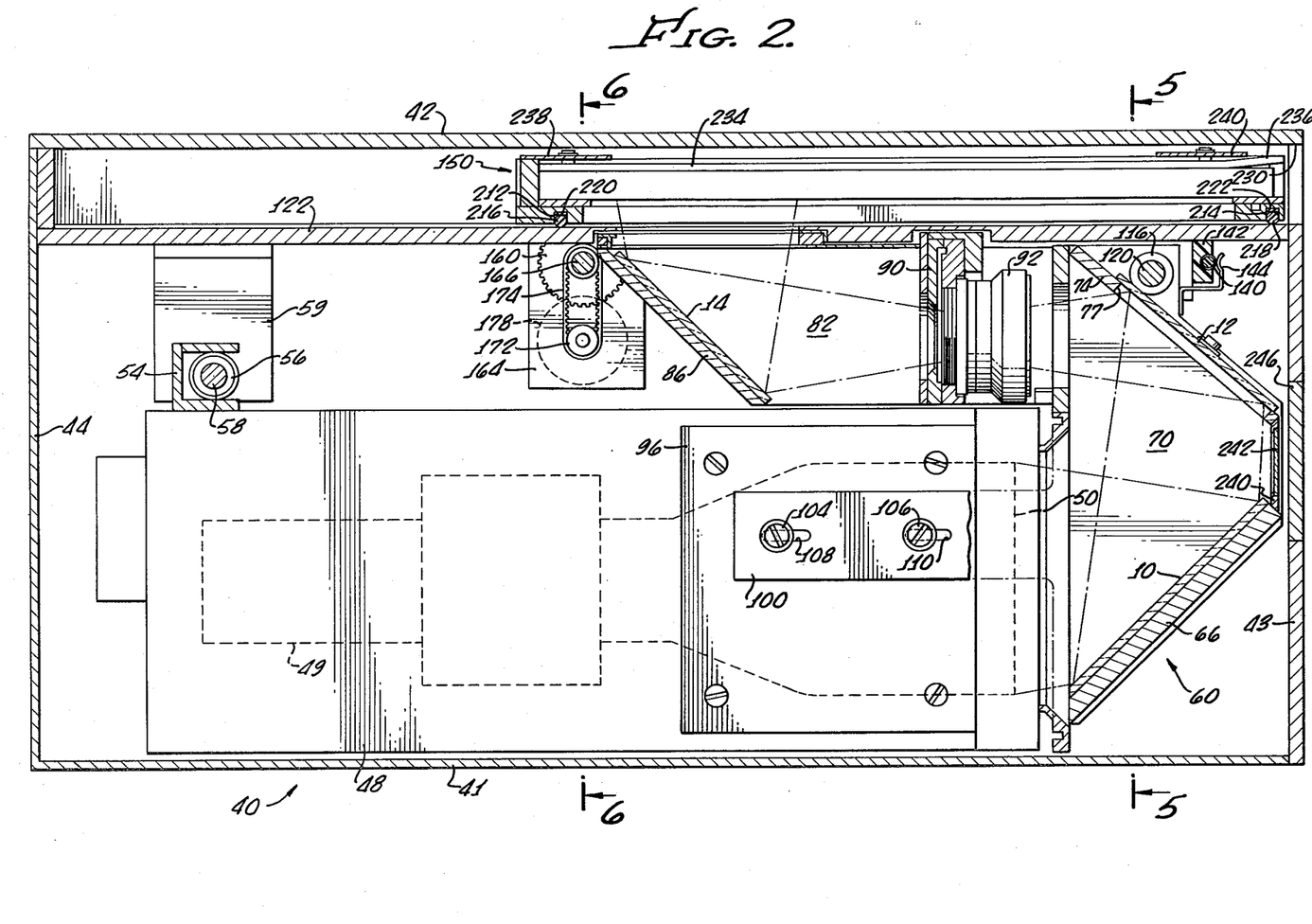
FIG. 2 is a vertical longitudinal section of a multiple image camera and video monitor embodying principles of the present invention.
Figure 3:
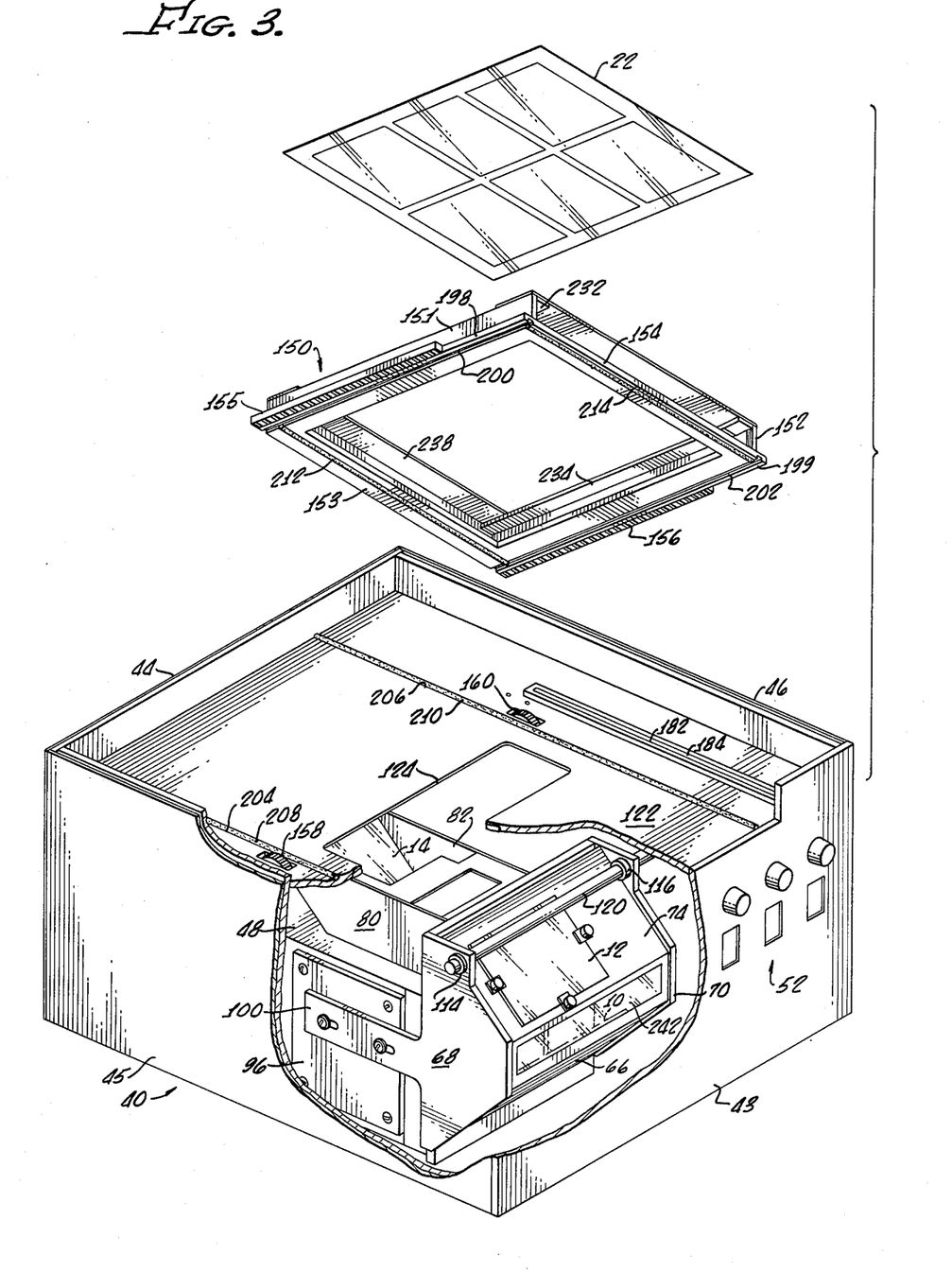
FIG. 3 is an exploded view, with parts broken away, showing the camera housing and video optical assembly, and showing the film carrier and film of the apparatus of FIG. 2 tilted to view these from below.
Figure 5:
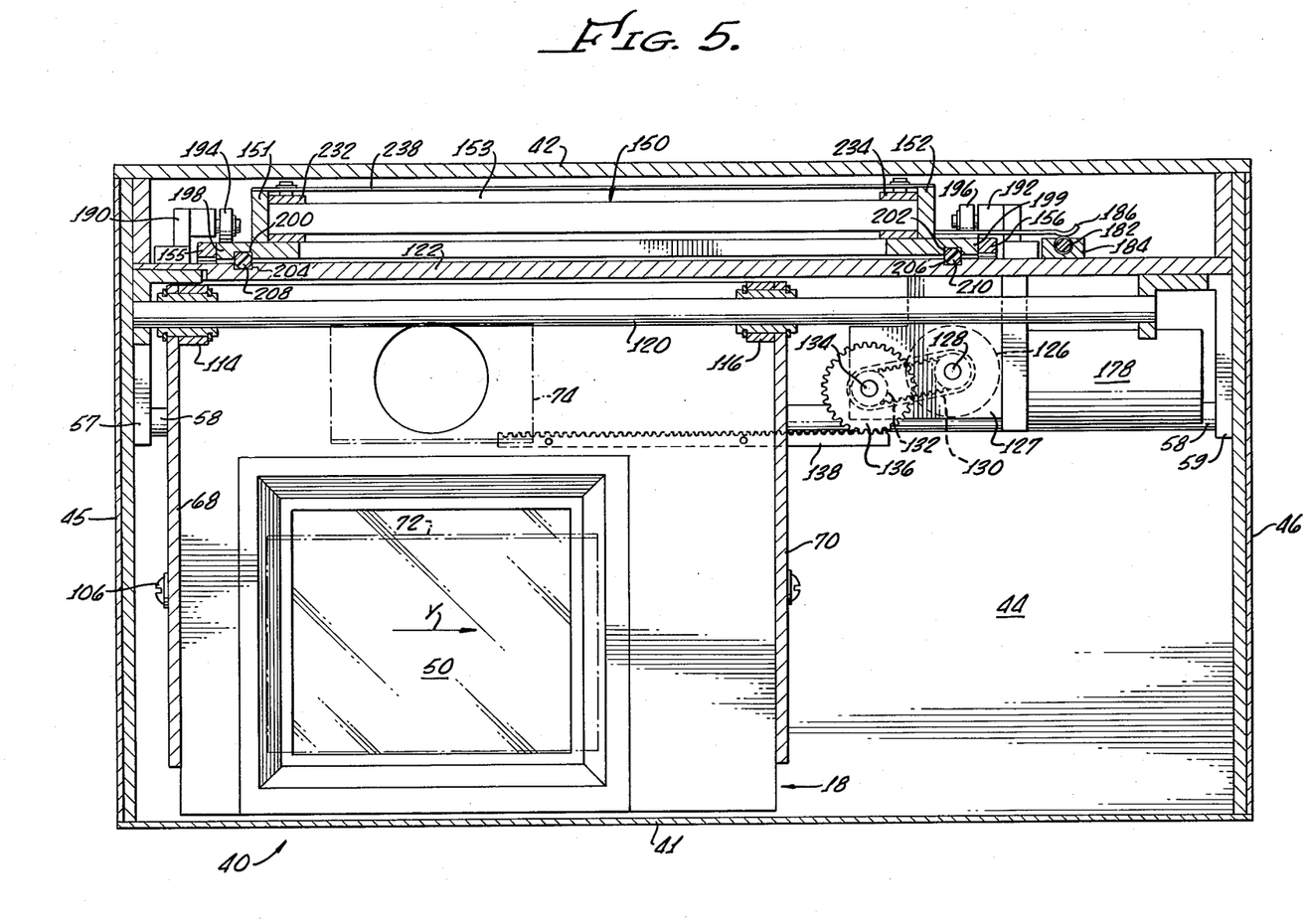
FIG. 5 is a vertical section taken on lines 5—5 of FIG. 2.

FIG. 2 shows the components schematically shown in FIG. 1 mounted in a lightweight, compact, table sized camera housing 40 having a bottom 41, top 42, front panel 43, rear panel 44 and side panels 45,46 (FIG. 5). Video monitor 18, typically a Tektronix 634 Monitor or equivalent, is mounted in frame or case 48 having a width or horizontal transverse dimension that is on the order of one-half of the width of the camera housing 40. Monitor frame 48 has a height somewhat less than its width and a length considerably greater than its width or height. The monitor case dimensions and configuration are governed primarily by the elongated shape of its cathode ray tube 49, having a long narrow body portion and an enlarged screen or display area 50 at its forward end, and the tube electronics that are packaged about the tube within the case. Suitable controls 52 (FIG. 3) for both the video electronics and photographic image positioning and exposure are mounted on the camera housing.

Figure 6:
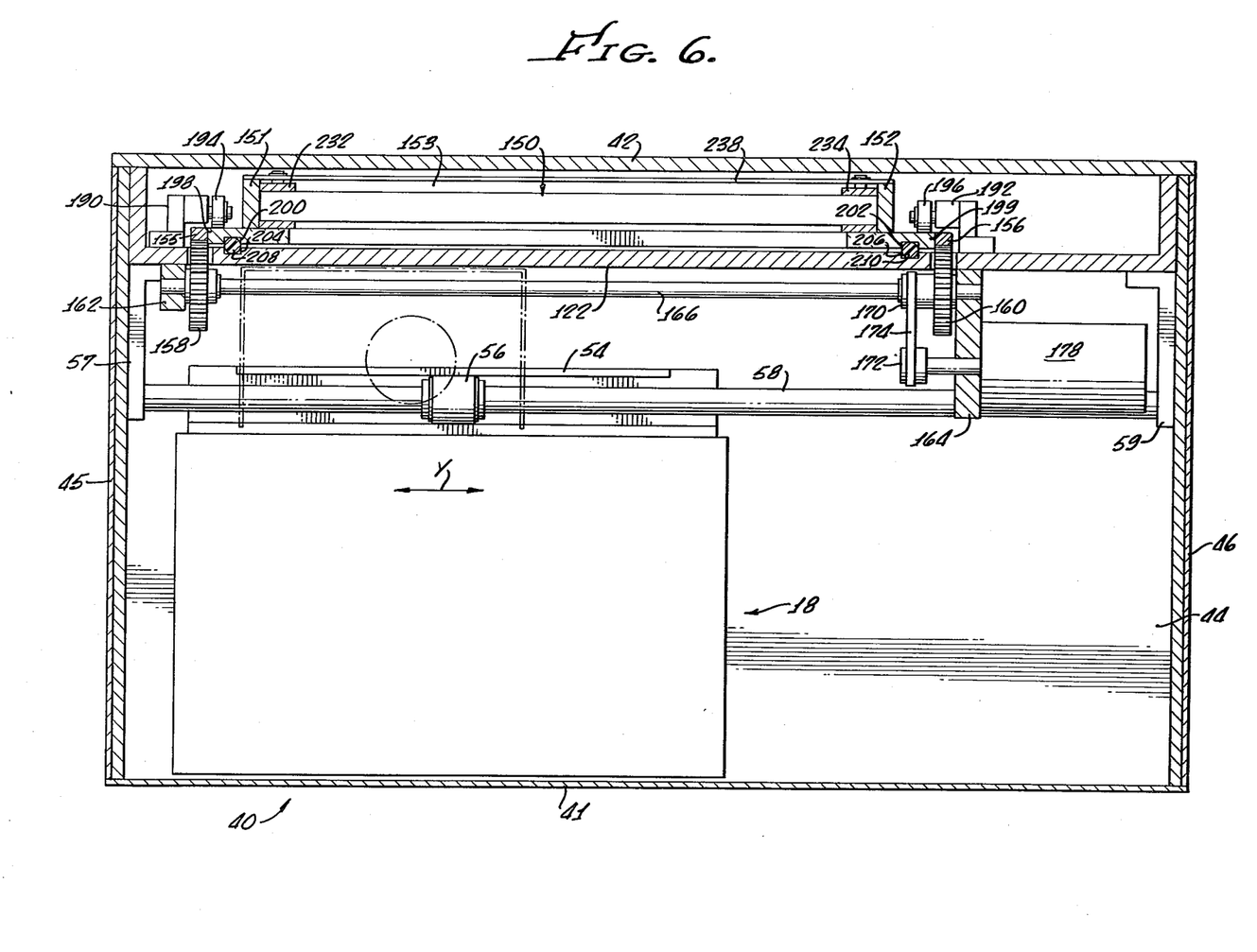
FIG. 6 is a vertical section taken on lines 6—6 of FIG. 2, omitting details of the video monitor.

A rear portion of the monitor case 48 fixedly carries a forwardly opening C-shaped channel 54 (FIG. 2) in which is slidably captured an antifriction sleeve 56 that is fixedly mounted upon a fixed transversely extending rear guide shaft 58 mounted in brackets 57,59 (FIG. 6) that are fixed in the camera housing.

An optical system housing, generally indicated at 60, has a front vertically extending section positioned between the camera housing front panel 43 and monitor screen 50, and a generally horizontally extending section projecting rearwardly from the front vertical housing section along the top of the monitor case 48 to the rear of screen 50. The vertical section of the optical system has a front bottom wall 66 (FIG. 2) inclined at an angle such as forty-five degrees to the substantially vertical plane of the monitor display screen, and extending transversely between optical housing side walls 68,70 (FIG. 5). Mounted on the inclined lower front wall 66 is the first mirror 10. An upper front wall 74 of the vertical section of the optical housing extends laterally between and is fixed to the side walls 68,70 and detachably carries on its forward, or outer, surface the second mirror 12 which bridges and closes an aperture 77 in wall 74.

The rearwardly extending section of the optical housing includes side walls 80,82 connected at their ends by a wall 86 upon which is mounted the third inclined mirror 14. Between mirrors 12 and 14, the horizontal rearwardly projecting optical housing leg carries a lens mount 90 in which is mounted a lens 92. Mirror 12 is detachably mounted to the outside of optical housing wall 74 to enable access to the lens 92 through the aperture in wall 74 when the mirror is removed.

Reinforcing plates 96 are bolted or otherwise fixedly attached to the sides of video monitor case 48 and rearwardly projecting sections 100 of optical housing sidewalls 68,70 are adjustably fixed to the plates 96 by means of bolts 104,106 extending through slots 108,110 formed in the rearward projections 100 of the optical housing sidewalls. This arrangement enables longitudinal adjustment of the optical housing relative to the video monitor case to provide a focus adjustment.

Upper forward portions of optical housing side plates 68,70 are provided with bushing lined apertures 114,116 that slidably receive a transversely extending forward guide shaft 120 that is fixed to and extends between the camera housing sidewalls 45,46. Thus, the guide shaft 120 at the front of the camera housing and guide shaft 58 at the rear of the housing cooperate to slidably suspend the rigidly interconnected video monitor case and optical housing for lateral or transverse motion from side to side within the camera housing 40. The channel 54 of the rear support permits the longitudinal adjustment of the video monitor casing relative to the optical housing within limits defined by length of the slots 108,110. Further, the monitor is readily detached and removed for servicing or replacement by removing bolts 104,106 sliding the monitor rearward to disengage the rear support channel 54 and removing the monitor through the back of the camera housing, having first detached the rear housing wall.

A partition in the form of a divider plate 122 extends horizontally across the entire area of the camera housing 40 from front to back and from side to side thereof, and is formed with a transversely elongated aperture 124 (FIG. 3) having a relatively smaller fore and aft dimension. Transverse aperture 124 is positioned centrally of the final leg 36 of the optical path formed by the light reflected from the third mirror 14.

An electric motor 126 (FIG. 5) is fixedly carried by bracket 127 fixed to the camera housing and has a drive shaft 128 connected via a tooth belt 130 and a pulley wheel 132 to drive a stub shaft 134 that fixedly carries a gear 136. Gear 136 meshes with a toothed rack 138 fixed to and projecting laterally from the optical housing.

For sensing lateral position of the monitor and optical housing, a linear potentiometer pick off is provided. The pick off is formed by a transversely extending resistor 140 (FIG. 2) carried on a bar 142 fixed to the camera housing and arranged for sliding contact with an L-shaped wiper arm 144 fixed to and transversely carried with the optical housing.

Partition 122 divides the camera housing into a relatively large lower chamber, in which is mounted the transversely slidable assembly of video monitor and optical system, and an upper chamber of considerably less vertical dimension but of substantially equal horizontal dimension. In the upper chamber is mounted a film carrier 150 comprising an open, generally rectangular frame having side, front and rear frame members 151,152,153,154 and fixed longitudinally extending downwardly facing toothed racks 155,156 arranged to mesh with gears 158,160 respectively. Gears 158 and 160 extend through apertures in divider plate 120 substantially at either side of the transversely elongated partition aperture 124 and are fixed to opposite ends of a transverse shaft 166 journalled at its ends in brackets 162,164 (FIG. 6) fixed to the camera housing. Gears 158 and 160 are driven by belt wheels 170,172 and belt 174 from a motor 178 fixedly mounted to the camera housing 40 on bracket 164.

A linear potentiometer position pick off in the form of an elctrical resistor 182 (FIG. 5) is carried by a longitudinally extending bar 184 for slidable contact with a wiper arm 186 carried by and extending laterally of the slide carrier 150.

Fixed to the partition plate 122 on either side of the film carrier 150 are carrier hold-down brackets 190,192 carrying rollers 194,196 that bear upon upwardly facing surfaces of laterally outwardly projecting side portions 198,199 of film carrier frame members 151,152. Thus, the carrier 150 may be driven forward and backward longitudinally of the camera housing and longitudinally of the video monitor optical housing assembly, and is pressed downwardly toward the camera housing partition plate 122 by pressure of the rollers 194,196.

In order to provide a light seal between the slidable film carrier 150 and partition plate 122, the underside of the side elements 198,199 of the carrier frame are provided with longitudinally extending grooves 200,202, respectively (FIGS. 3, 5 and 6), which are downwardly facing and extend the entire length of the carrier. Grooves 200 and 202 respectively face and mate with corresponding upwardly facing grooves 204,206 extending the length of the partition 122 on either side of the transversely elongated aperture 124. Rigid antifriction rods 208,210 made of or coated with Teflon or similar antifriction material are captured within mating pairs of grooves 200,204 and 202,206. The Teflon rods, extending across the gap between the partition plate and underside of the film carrier not only provide antifriction bearings for the slidable longitudinal motion of the carrier, maintaining a suitable gap between the carrier and partition, but also provide an effective light barrier to help seal the optical system and film from entrance of ambient light. The circular cross section of the rods insures a minimum line contact with the slidable parts.

The light seal is completed by the provision of a pair of transversely extending and downwardly facing open grooves 212,214 formed in the front and back elements of the slide carrier frame which capture transversely extending rigid Teflon or Teflon coated rods 216,218 respectively (FIG. 2). For the transverse rods 216,218 there is no mating groove corresponding to their grooves 212,214. Rods 216,218 are further pressed downwardly toward their engagement with the upper surface of the partition plate by means of resilient pads 220,222 interposed between the respective rods and their grooves. Grooves 212 and 214, together with the rods 216,218 captured therein, extend transversely for the full distance between the longitudinally extending grooves 200,202 and the rods captured therein. Thus, a complete perimetral light seal is provided by sliding antifriction rods that also provide a slide bearing for the film carrier having only a line contact with the slidable parts.

A conventional film holder (not shown) containing a sheet film of, for example, eight inches by ten inches, and a dark slide cover, is adapted to be inserted into the film carrier 150 through an opening 230 in the camera housing front panel 43, and through the open front of the carrier. The latter is provided with longitudinally extending film holder guide straps 232,234 spaced above the bottom of the carrier and diverging upwardly at their forward ends 236 (FIG. 2) to snugly guide and position the film holder (not shown) to and within the carrier. Transverse straps 238,240 are fixed to and span the carrier sides and support the guide straps 232,234.

The drive motors 126 and 178 may be individually manually controlled or may be automatically controlled according to a selected program by arrangements well known to those skilled in the art. Preferably, the described position pick offs, in the form of the illustrated linear potentiometers, or other similar or equivalent position pick offs, are employed for closed loop servo drive to achieve more accurate positioning. The two motors are preferably controlled in a programmed arrangement so as to automatically shift the video monitor/optical assembly and the slide carrier assembly, one after the other or together, so as to cause the output optical path section 36 to be centered upon film areas 20a and 20b through 20e in a selected sequence. Conveniently, electrical interconnection is provided between the camera exposure control, which may be a conventional shutter mechanism (not shown), or its electronic equivalent in control circuitry of the cathode ray tube of the video monitor, so that immediately following exposure of a selected area of the film an appropriate one of the motors 126 and 178 is energized to shift either the video monitor and optical assembly or the film sheet to the next one of a predetermined program of positions. Details of such automatic control are well known to those skilled in the art and may be varied without departing from principles of the present invention.

Although an exemplary film format of six exposures on a single eight by ten inch film sheet has been illustrated and described, it will be readily appreciated that other film sizes and formats may be employed as deemed necessary or desirable, such as an array of four, nine or more exposures. To vary the number of exposures employed for a single sheet of film, one merely changes the amount of magnification by variation of the lens or electrically varying the size of display provided on the oscilloscope face, and changes the programmed step-by-step positioning of the video monitor/optical housing assembly and of the film holder carrier.

In operation of the camera, sheet film in its film holder is slidably inserted through the transversely extending aperture 230 at the front of the camera housing into its position upon the film carrier 150, so that the film holder covers and engages the upper surface of the carrier frame elements. The dark slide cover may then be removed since the grooves and rods of the combined light seal and slide block ambient light. The camera components then may be properly positioned for the initial exposure. The controls are operated to manually position a selected area of the film sheet for exposure or to manually position the film sheet at a home position and exposure of the first film area is commanded by the operator. Upon each commanded exposure, the motors shift the monitor or the carrier, as appropriate, for positioning of the next area to be exposed.

The described folded optical path and arrangement of the optical housing uniquely allow for direct viewing by the operator of the face of the video monitor. To this end, the optical housing vertical section is provided with a generally upwardly extending wall section 240 extending from the upper end of wall 66 to the lower end of wall 74 and laterally from side to side of the optical housing. A viewing aperture is formed in the wall 240 and closed in dust tight relation by a viewing window 242 to allow an operator to directly view the monitor face 50. Access to window 242 is provided via a door 246 in the front panel 43. Door 246 is closed to seal the interior of the optical housing in light tight relation when the monitor face is being photographed.

If deemed necessary or desirable, the image on the photographic film, which is optically reversed by the use of an odd number of mirrors, may be electrically reversed as it appears on the display of the oscilloscope, so that there is no reversal in the resulting photographic image.

Although the described camera is designed to be supported on a horizontal table top or equivalent, with the oscilloscope axis horizontal and the screen face vertical, it will be readily appreciated that the camera can be operated in other orientations, such as for example, a vertical orientation in which the screen is substantially horizontal. Accordingly, the terms vertical and horizontal, as used herein, are intended to encompass other orientations and are not to be construed as limiting this camera to any particular orientation.

The decrease in overall size of the total package of this multiple image camera is significantly enhanced by the choice of motions of the monitor/optical housing on the one hand and the film carrier on the other, chosen in the light of the relative dimensions of these parts. As can be seen best in FIG. 2, the longitudinal extent of the video monitor/optical housing combination is considerably greater than the longitudinal extent, the greater dimension, of the sheet film carrier. Thus for a given longitudinal extent of the video monitor/optical housing combination, the desired longitudinal motion of the shorter film carrier relative to the display screen can be achieved in a lesser overall longitudinal area by moving the carrier in the camera housing, rather than by moving the longer monitor/optical housing combination. If the film and carrier were longitudinally fixed and the monitor and optical housing moved longitudinally, the camera housing longitudinal dimension would have to be significantly increased. The decrease in length of the apparatus is particularly aided by use of the folded optical path to provide an outout leg 36 positioned rearwardly of the display screen, at an intermediate point between the front and back of the video monitor and in a direction perpendicular to the longitudinal extent of the monitor. The provision of a folded optical path having the long longitudinal path leg 34 extending rearwardly of the display screen enables a decrease in length of the vertical leg of the optical path, and a concommitant decrease in overall height. It also enables a decrease in the horizontal path leg 30 and, therefore, a decrease in overall length.

Transverse motion of the video monitor and optical housing is chosen for minimizing the overall transverse dimension of the system. The minimization of the transverse dimension is significantly enhanced because of the fact that the width of the video monitor case (substantially equal to the width of the optical system housing) is less than the width of the film carrier. Thus, the video monitor case may be laterally shifted to its several positions and remain within a transversely smaller area than would be the case if the film carrier were laterally shifted.

It will be seen that there has been described an improved multiple image in which a folded optical system fixed to a video monitor is movable transversely with the monitor while a film carrier is movable longitudinally to provide selected X Y positioning of multiple images of the monitor screen at selected areas of a film sheet, all within a minimum sized package.

The foregoing detailed description is to be clearly understood as given by way of illustration and example only, the spirit and scope of this invention being limited solely by the appended claims.

What is claimed is:

1. A multiple image camera comprising
a camera housing,
a video monitor mounted in said housing for bi-directional motion in a transverse direction relative to the housing,
film transport means mounted in said housing for bi-directional transport of film in a longitudinal direction relative to the housing, and
means for transmitting an image of an object from said monitor for reception by film transported by the transport means.

2. A multiple image camera comprising
a camera housing having a length, width and depth extending in first, second and third directions respectively,
an object forming device mounted in said housing for bi-directional motion in said second direction,
a sheet film carrier mounted in said housing for bi-directional motion in said first direction,
means for transmitting an image of an object from said device to said sheet film carrier for reception by film carrier by the carrier, said device including means for forming an object in a plane substantially parallel to said second and third directions, and said carrier including means for supporting film in a plane parallel to said first and second directions.

3. A multiple image camera comprising
a camera housing having a length, width and depth extending in first, second and third directions respectively, an object forming device mounted in said housing for bi-directional motion in said second direction, a sheet film carrier mounted in said housing for bi-directional motion in said first direction, means for transmitting an image of an object from said device to said sheet film carrier for reception by film carried by the carrier, said means for transmitting comprising folded optical means for transmitting light from said device along a folded path extending successively in said first direction, said third direction, reversely in said first direction, and again in said third direction.

4. A multiple image camera comprising a camera housing having a length, width and depth extending in first, second and third directions respectively, an object forming device mounted in said housing for bi-directional motion in said second direction, a sheet film carrier mounted in said housing for bi-directional motion in said first direction, and means for transmitting an image of an object from said device to said sheet film carrier for reception by film carried by the carrier, said object forming device comprising a video monitor extending longitudinally in said camera housing and having a display screen at its front end, and wherein said film carrier is mounted adjacent said monitor for movement to at least two image exposing positions behind said display screen.

5. A multiple image camera comprising a camera housing having a length, width and depth extending in first, second and third directions respectively, an object forming device mounted in said housing for bi-directional motion in said second direction, a sheet film carrier mounted in said housing for bi-directional motio in said first direction, and means for transmitting an image of an object from said device to said sheet film carrier for reception by film carried by the carrier, said object forming device comprising a video monitor having a longitudinal axis extending in said first direction, and wherein said film carrier is mounted for motion in a plane parallel to said axis.

6. The camera of claim 5 wherein said film carrier has a length in said first direction less than the length of said monitor and optical housing and has a width in said second direction not less than the width of said monitor.

7. A multi-image camera comprising an oscilloscope having a screen at a forward end thereof providing a display to be photographed, and having an axis substantially perpendicular to said screen, optical means for transmitting light from said screen along an output axis substantially perpendicular to said first mentioned axis and positioned rearwardly of said screen, a housing, means for mounting said oscilloscope and optical means in said housing for bi-directional motion in a first direction perpendicular to said output axis, and a film carrier mounted in said housing for bi-directional motion in a second direction perpendicular to said first direction and to said output axis.

8. The camera of claim 7 wherein said film carrier is mounted for motion in a plane parallel to said first mentioned axis and substantially perpendicular to said screen.

9. A multiple image camera comprising an oscilloscope having a screen at one end thereof for providing a display to be photographed, a folded optical system for receiving light from said screen and transmitting such light along an output path positioned rearwardly of said screen and extending substantially parallel thereto, a housing, means for mounting said oscilloscope and said optical system for bi-directional motion in a first direction substantially parallel to said screen, a film carrier mounted to said housing for motion in a second direction substantially perpendicular to said output path and substantially perpendicular to said screen, and means for moving said film carrier and said oscilloscope and optical system.

10. The camera of claim 9 wherein said housing includes a partition separating said housing into first and second chambers along a plane substantially normal to the plane of said screen, said partition having an aperture positioned rearwardly of said oscilloscope screen and substantially centered upon said output path.

11. The camera of claim 10 wherein said optical system comprises an optical system frame fixed to said oscilloscope, a first mirror carried by said frame and oriented at substantially forty-five degrees with respect to said screen, a second mirror carried by said frame, displaced from said first mirror and oriented at substantially ninety degrees relative thereto, a third mirror carried by said frame substantially parallel to said second mirror and positioned at said partition aperture, and a lens interposed between two of said mirrors.

12. The camera of claim 11 wherein said partition comprises a divider panel extending across said housing from front to back and from side to side and means interposed between said divider panel and said film carrier for blocking passage of light therebetween.

13. The camera of claim 12 wherein said means for blocking passage of light comprises first and second parallel mutually spaced pairs of facing and mating grooves in said carrier and in said divider panel respectively, and a light sealing antifriction rod captured in said grooves.

14. The camera of claim 13 wherein said light sealing means further includes third and fourth grooves in one of said panel and carrier spaced from each other, and extending from and between grooves of said first and second pairs, third and fourth light sealing antifriction rods seated in said third and fourth grooves and bearing upon the other of said panel and carrier, and means for pressing said carrier toward said divider panel.

15. A multi-image camera comprising a camera housing having a horizontal partition extending in said housing from front to back and from side to side and dividing said housing into lower and upper chambers, said partition having an elongated aperture, an oscilloscope in said lower chamber having an elongated body and a display screen at a front end thereof, said screen facing the front of said housing and spaced rearwardly thereof, an angulated optical housing fixed to said oscilloscope body, said optical housing having a vertical section extending between said screen and the front of said camera housing and having a horizontal section extending rearwardly from said vertical section between said oscilloscope body and said partition, first and second inclined mirrors mounted in said vertical housing section for reflecting light from said screen upwardly in said vertical section and rearwardly from said vertical section along and through said horizontal section, a third inclined mirror mounted in said horizontal section at a rear portion thereof for reflecting light upwardly through said partition aperture, a lens interposed between said second and third mirrors, means for mounting said oscilloscope and optical housing for unitary slidable motion within said lower chamber from side to side of said camera housing, a film carrier mounted in said upper chamber for bi-directional motion from front to back of said camera housing, and light sealing means interposed between said carrier and said partition for providing a light seal around the periphery of said partition aperture.

16. The camera of claim 15 including means for adjustably connecting said optical housing to said oscilloscope body to permit selective variation of the distance between said vertical optical housing section and said oscilloscope screen.

17. The camera of claim 15 including a pair of mutually spaced downwardly facing toothed racks fixed to said carrier, first and second mutually spaced gears engaged with respective ones of said racks and journalled in said camera housing, and means for rotating said gears to drive said carrier forwardly or rearwardly of said camera housing.

18. The camera of claim 15 including a toothed rack fixed to said optical housing and extending laterally there from within said camera housing, a lateral drive gear journalled in said camera housing and meshed with said last named toothed rack, and means for rotating said lateral drive gear to drive said oscilloscope and optical housing from side to side within said camera housing.

19. The camera of claim 15 wherein said oscilloscope body has a width not greater than the width of said film carrier and a length greater than the length of said film carrier.

20. A multi-image oscilloscope camera comprising
a camera housing,
a divider in said housing for separating the interior thereof into first and second sections and having a transversely extending elongated aperture positioned intermediate the front and back of said oscilloscope,
an elongated relatively narrow oscilloscope mounted within said first section for bi-directional motion transversely of the longitudinal extent of said oscilloscope, said oscilloscope having a display face lying in a plane substantially perpendicular to said longitudinal extent,
optical means connected to said oscilloscope and movable therewith for transmitting light from the face of said oscilloscope along a folded path having an output leg extending substantially parallel to said oscilloscope screen and extending through said divider aperture, and
a film slide carrier mounted to said housing in said second section for bi-directional motion longitudinally of said oscilloscope.

21. The camera of claim 20 including combined antifriction and light sealing means interposed between said film slide carrier and said divider and circumscribing said elongated aperture, said antifriction and light sealing means comprising opposing grooves in said carrier and divider, and rigid low friction rods in said grooves.

22. The method of making multiple images of the display face of an elongated video monitor comprising
directing light from said display face along a folded optical path having one leg positioned behind said display face and substantially parallel thereto,
positioning part of a film between the front and back of said monitor in a plane substantially parallel to the longitudinal extent of said monitor to intercept said optical path leg,
exposing a portion of said film, and
shifting said film longitudinally of said monitor to position a second portion of said film for exposure to light in said optical path leg.

23. The method of claim 22 including the step of shifting said monitor transversely of said film to position another portion of said film for exposure to light in said optical path leg.

24. A multiple image camera comprising
a camera housing,
a video monitor mounted in said housing, said monitor having a length greater than its width and having a display face at a front end thereof,
means for directing light from said display face along a folded optical path having an output section substantially perpendicular to the longitudinal extent of said monitor and displaced rearwardly of said front end,
means for supporting at least a part of a sheet film in said camera housing adjacent to and between the front and back of said monitor for slidable motion longitudinally of said monitor in a plane perpendicular to said optical path output section, said sheet film having a length less than the length of said monitor, and
means for shifting said sheet film relative to said housing to different longitudinal positions.

25. The camera of claim 24 wherein said optical path includes a second section extending substantially parallel to the longitudinal extent of said monitor, and a lens mounted in said second path section, and including means for adjustably securing said light directing means to said monitor for focusing of said lens.

26. A multiple image camera comprising
a camera housing having a partition dividing the housing into first and second chambers, said partition having a light transmitting aperture therein,
means in said first chamber for transmitting through said aperture light from an object in said first chamber to be photographed,
a film carrier slidably mounted in said second chamber, and
slide means for providing a light seal and slide bearing between said film carrier and said partition, said slide means comprising
first and second parallel mutually spaced pairs of facing and mating grooves in said carrier and in said partition respectively,
elongated light sealing antifriction members captured in said grooves, and
means for pressing said carrier against said partition.

27. The camera of claim 26 wherein said antifriction members are rigid rods of circular cross section.

28. The camera of claim 27 wherein said light sealing means further includes third and fourth grooves in one of said partition and carrier spaced from each other and extending between grooves of said first and second pairs, and third and fourth light sealing antifriction rods seated in said third and fourth grooves and bearing upon the other of said panel and carrier.

29. The camera of claim 28 including resilient means in said third and fourth grooves for urging said third and fourth rods outwardly of said third and fourth grooves.

30. A multiple image camera having an oscilloscope and a film transporter arranged to form multiple images of the oscilloscope screen on film moved by the transporter, the camera being characterized by
    optical means for transmitting light from the oscilloscope screen along an output axis behind the screen and generally parallel to the screen,
    means for mounting the oscilloscope and optical means for bi-directional transverse motion, and
    means for mounting the film for bi-directional longitudinal motion in a plane perpendicular to said output axis.

31. The camera of claim 30 wherein said optical means transmits light in a folded path extending successively forwardly from the screen, transversely of the screen, rearwardly of the screen, and then along said output axis.

32. A multi-image camera comprising
    an oscilloscope having a screen at a forward end thereof providing a display to be photographed, and having an axis substantially perpendicular to said screen,
    optical means for transmitting light from said screen along an output axis substantially perpendicular to said first mentioned axis and positioned rearwardly of said screen,
    a housing,
    means for mounting said oscilloscope and optical means in said housing for bi-directional motion in a first direction perpendicular to said output axis, and
    means for mounting film in said housing for bi-directional motion in a second direction perpendicular to said first direction and to said output axis.

33. The camera of claim 32 wherein said film is mounted for motion in a plane parallel to said first mentioned axis and substantially perpendicular to said screen.

34. A multiple image camera comprising
    a camera housing,
    a video monitor extending longitudinally in said camera housing and having a display screen at its front end, said video monitor being mounted in said housing for bi-directional motion in a transverse direction,
    means for mounting film in said housing for bi-directional motion in a longitudinal direction to at least two image exposing positions behind said display screen, and
    means for transmitting an image of an object from said monitor for reception by said film.

* * * * *